United States Patent [19]

Caldwell

[11] Patent Number: 4,469,354
[45] Date of Patent: Sep. 4, 1984

[54] BREAKAWAY DUCT COUPLING

[75] Inventor: Jack H. Caldwell, Kent, Wash.

[73] Assignee: The Boeing Company, Seattle, Wash.

[21] Appl. No.: 429,875

[22] Filed: Sep. 30, 1982

[51] Int. Cl.³ .............................................. F16L 35/00
[52] U.S. Cl. ...................................... 285/2; 285/367; 285/408
[58] Field of Search ................. 285/2, 3, 4, 367, 366, 285/365, 408, 409, 410, 411

[56] References Cited

U.S. PATENT DOCUMENTS

| | | |
|---|---|---|
| 37,929 | 3/1863 | Warner . |
| 2,083,054 | 6/1937 | Cline . |
| 2,138,159 | 11/1938 | Hanks . |
| 2,166,412 | 7/1939 | Kiesel . |
| 2,548,249 | 4/1951 | Woolsey . |
| 2,653,836 | 9/1953 | Christophersen et al. . |
| 2,809,584 | 10/1957 | Smith . |
| 2,882,071 | 4/1959 | Klompar ........................... 285/409 |
| 2,896,978 | 7/1959 | Schumacher . |
| 3,109,216 | 11/1963 | Brown ............................... 285/2 X |
| 3,455,582 | 7/1969 | Von Hoevel ................... 285/367 X |
| 3,458,217 | 7/1969 | Pride, Jr. et al. ..................... 285/3 |
| 3,652,110 | 3/1972 | Manton . |
| 3,747,366 | 7/1973 | Ruggen et al. . |
| 3,837,752 | 9/1974 | Shewchuk . |
| 3,858,987 | 1/1975 | Kleinhans et al. . |
| 4,128,921 | 12/1978 | Heinze et al. ................... 285/408 X |

Primary Examiner—Thomas F. Callaghan
Attorney, Agent, or Firm—James P. Hamley; B. A. Donahue

[57] ABSTRACT

Flanges (12, 14) attached to duct sections mate to form a ribbed portion around the circumference of the ducts. A plurality of U-channel shaped sections (50, 52, 54) are placed over the ribbed portion with a band (40) holding the sections in place, thereby securing the coupling. Each U-channel section is formed of parallel side sections (20, 22) secured to a segment via shearable fasteners (26). A sufficient bending load to the ducts causes shearing of the fasteners thereby releasing the duct coupling.

1 Claim, 4 Drawing Figures

4,469,354

BREAKAWAY DUCT COUPLING

BACKGROUND OF THE INVENTION

The present invention pertains to the duct coupling art and, more particularly, to a duct coupling which releases upon application of a predetermined bending load.

There has been a long felt need in the duct coupling art for a precision, breakaway coupling. A particular application for such a coupling is found in the aircraft art. In aircraft having wing-mounted engines, it is common to provide a means for the engine to sever from the wing during a violent maneuver. This creates a potential hazard in that there are numerous interconnects between the engine and aircraft, including one or more metal pneumatic ducts.

In the event of an engine severance, there is a potential risk to the aircraft wing structure, including control surfaces, by impact from the pneumatic ducting. To eliminate this risk, a duct coupling must be provided which has the feature of disjoining duct sections upon application of a sufficient bending load. While the prior art has developed certain breakaway couplings for other applications, none of these couplings has proved suitable for use in an aircraft engine severance application.

SUMMARY OF THE INVENTION

It is an object of this invention, therefore, to provide a precision, breakaway duct coupling which is both simple and inexpensive to manufacture.

Briefly, according to the invention, a breakaway duct coupling includes a pair of flange sections, with each flange section adapted to both mate with the duct section and with each other to form a ribbed portion around the circumference of the ducts. A plurality of U-channel sections fit over the ribbed flange portion with the side sections of the U-channel bearing against the rib thereby tending to couple the ducts. Each U-channel includes parallel, predeterminedly spaced side sections secured via shearable fasteners to a segment portion. A strap encircles the U-channel sections, bearing against the segment portions thereby securing the coupling. The shearable fasteners are designed such that upon a predetermined bending load being applied to the duct, the fasteners shear thereby releasing the duct coupling.

DETAILED DESCRIPTION OF THE PREFERRED EMBODIMENT OF THE INVENTION

Figure 1:
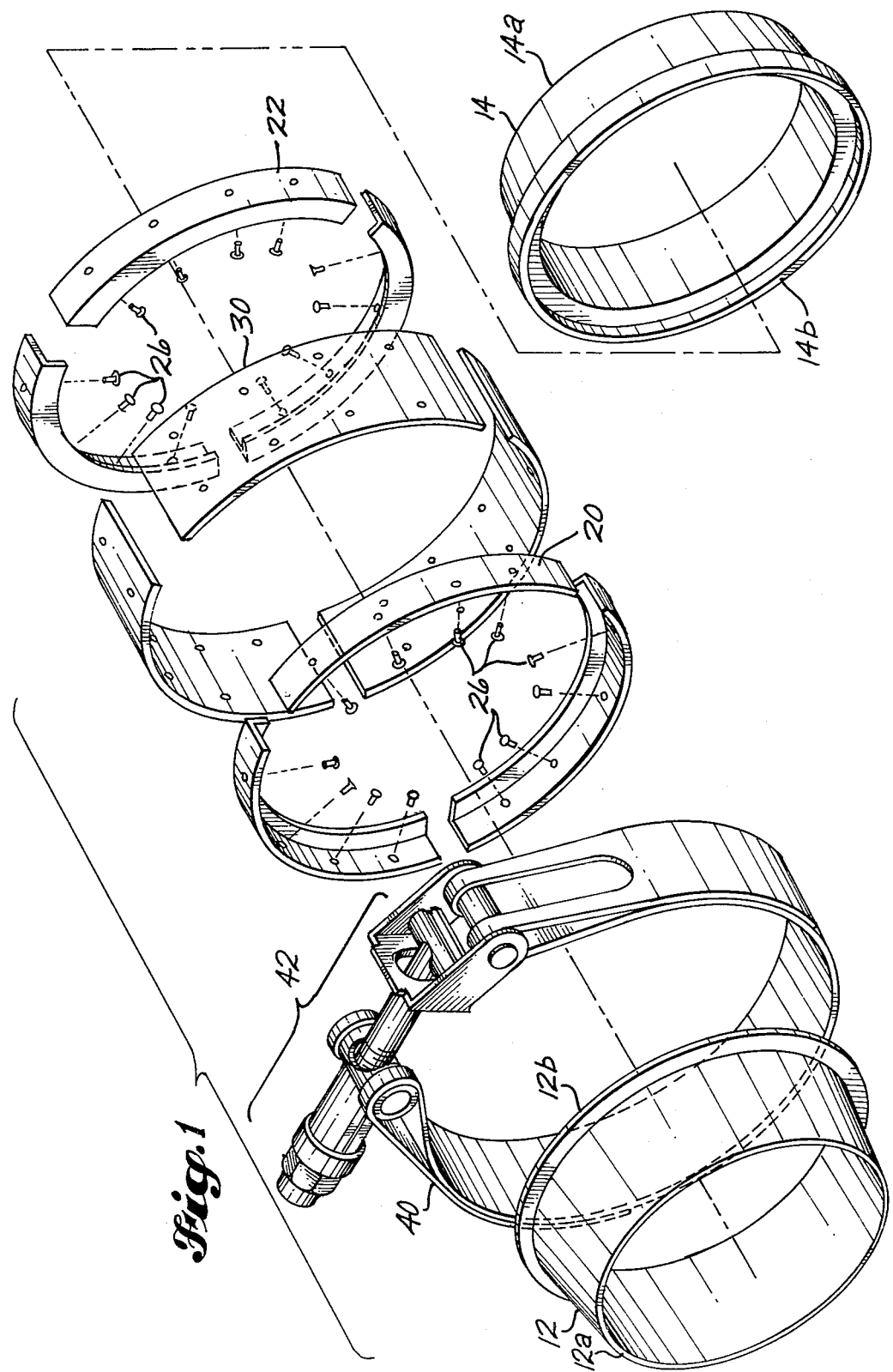
FIG. 1 is an exploded view of the components of the preferred embodiment of the breakaway duct coupling.

FIG. 1 is a perspective, exploded view of the various components used to form the present duct coupling. A pair of flanges 12, 14 are adapted to mate with the ducts to be joined. Thus, for pneumatic ducts as found in aircraft, flanges 12, 14 are metal, and mate with the metal ducting (not shown) at flange ends 12a, 14a by a weld or other suitable bonding agent. The opposite end of each flange 12, 14 is provided with a lip 12b, 14b which, when the flange sections are joined, forms a circumferential rib, as is shown more clearly in FIG. 2. In addition, the lips 12b, 14b are configured to form an interlocking arrangement, and may be provided with an intermediate gasket, these items being more clearly shown in FIG. 3A.

The circumferential rib formed by the joining of the flanges 12, 14 is secured as a coupling via a series of U-channel sections. Each U-channel section includes a pair of parallel, predeterminedly spaced side sections, such as sections 20, 22, which side sections are secured via a plurality of shearable fasteners, here rivets 26, to an arcuate segment portion, such as portion 30. The spacing of the side members 20, 22 is designed such that these members bear against the rib formed by the mating lips 12b, 14b thereby tending to hold the flange sections 12, 14 together. The number of rivets, the dimension of each rivet and the material from which the rivet is formed are all carefully selected to provide the fastener shear and coupling breakaway operation as described with respect to FIGS. 3A, 3B.

The entire assembly of the mated flanges 12, 14, and the joining U-channel sections are held together by an adjustable band strap assembly 40. The band strap is placed over the segment portions, such as portion 30, of the U-channels and then is tightened, via the adjustable mechanism 42 such that the band bears against the segment portions, thereby forcing the U-channel side sections, such as sections 20, 22 to firmly bear against the rib formed by lips 12b, 14b, thereby securing the coupling. In some applications it may be desirable to weld strap 40 to each arcuate segment portion 30.

Figure 2:
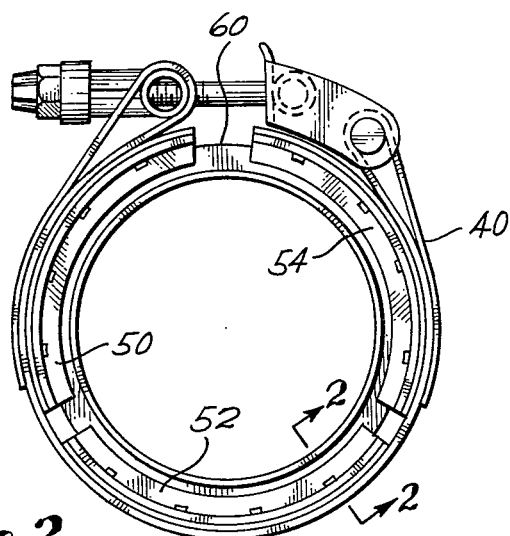
FIG. 2 is a cross-sectional view of an assembled duct coupling.

FIG. 2 is a cross-sectional view of the completed coupling. As shown, the band assembly 40 has been tightened around three U-channels 50, 52 and 54. The side pieces of each U-channel bear against the rib 60, formed by the flange sections, thereby securing the assembly.

Figure 3A:
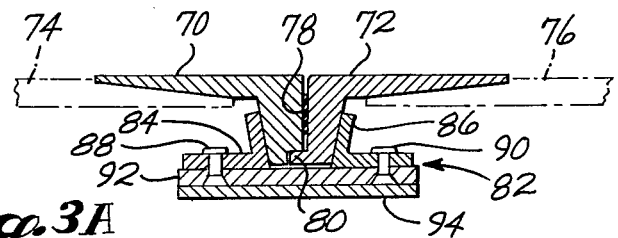
FIGS. 3A, 3B illustrate the breakaway action of the coupling.
Figure 3B:
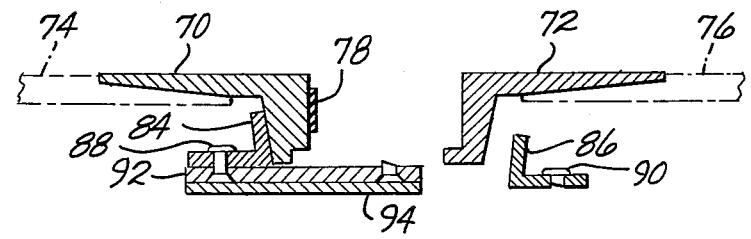

FIGS. 3A and 3B are cross-sectional views of a portion of the coupling, illustrating its breakaway operation. Shown are portions of flanges 70, 72 which are bonded to ducts 74, 76, respectively. A gasket 78 may be used between the ducts to perfect the seal. The ducts interlock via a protrusion 80 on flange 72 which is received in a recess provided in flange 70. A U-channel member, indicated generally at 82, includes side sections 84, 86 which are secured via fasteners (rivets) 88, 90 to a segment portion 92. A strap 94 bears against the segment portion 92 thereby causing the side pieces 84, 86 to bear against, and secure the rib formed by the flanges 70, 72.

Upon application of a sufficient bending force to the ducting, the fasteners, such as rivet 90, shear thereby releasing a side section, such as section 86, and thereby providing a means for the release of flange 72 from the remainder of the coupling. (This is shown in FIG. 3B.)

A particular feature of the invention is that the precise force required to shear a fastener, such as a rivet, may be precisely controlled. The invention makes use of this fact by providing coupling breakaway solely as a function of the shear force required to shear such fasteners.

Thus, although the components of the present breakaway duct coupling are simple and inexpensive to manufacture, the bending moment required to release the coupling is precisely controlled by use of the shearable fasteners.

While a preferred embodiment of the invention has been described in detail, it should be apparent that many modifications and variations thereto are possible, all of which fall within the true spirit and scope of the invention.

I claim:

1. A breakaway duct coupling comprising:
   a pair of flange sections, each flange section adapted to both mate with a duct section and with each other to form a ribbed portion around the circumference of the ducts to be joined;
   a plurality of U-channel sections, each section comprising parallel, predeterminedly spaced side sections secured via shearable fasteners to a segment portion, the U-channel sections adapted to fit over said ribbed portion with said side sections bearing against the flange ribbed portion tending to couple the ducts, the U-channel sections being predeterminedly spaced one to the other around said ribbed portion; and
   a band adapted to encircle the U-channel sections and bear against said segment portions thereby securing the coupling;
   the shearable fasteners being designed such that upon a predetermined bending load being applied to the duct, the fasteners shear thereby releasing the duct coupling.

* * * * *